United States Patent
Garcia

(10) Patent No.: US 9,479,212 B1
(45) Date of Patent: Oct. 25, 2016

(54) HYPE

(71) Applicant: Fred Garcia, Hampton, VA (US)

(72) Inventor: Fred Garcia, Hampton, VA (US)

( * ) Notice: Subject to any disclaimer, the term of this patent is extended or adjusted under 35 U.S.C. 154(b) by 0 days.

(21) Appl. No.: 14/864,989

(22) Filed: Sep. 25, 2015

(51) Int. Cl.
  *H04B 1/38* (2015.01)
  *H04B 1/3888* (2015.01)
  *G06F 1/20* (2006.01)
  *G06F 1/18* (2006.01)
  *H05K 7/20* (2006.01)

(52) U.S. Cl.
  CPC ............. *H04B 1/3888* (2013.01); *G06F 1/189* (2013.01); *G06F 1/203* (2013.01); *H05K 7/20136* (2013.01)

(58) Field of Classification Search
  CPC ..... H04B 1/3888; G06F 1/189; G06F 1/203; H05K 7/20136
  See application file for complete search history.

(56) References Cited

U.S. PATENT DOCUMENTS

| | | | | |
|---|---|---|---|---|
| 8,169,185 | B2* | 5/2012 | Partovi | H01F 5/003 320/108 |
| 2014/0029195 | A1* | 1/2014 | Barnes | G06F 1/1635 361/679.48 |
| 2014/0061273 | A1* | 3/2014 | Bullivant | A45F 3/04 224/576 |

* cited by examiner

*Primary Examiner* — Kashif Siddiqui
(74) *Attorney, Agent, or Firm* — Mack N. Haynes

(57) ABSTRACT

The present invention discloses an protective case, for electronic devices viz. mobiles, laptops, tablet, GPS, pulse, hand held gaming device and i-watch, which is comprised of a cooling fan(s) and air holes, solar panels, red, yellow, and green light indicators, a USB port, a switch enabled with 3 modes, crank, and a kink stand. A protective case involves various attractive designs and that contains the back-up battery. Therefore, the case provides the both primary source and secondary source of power. This case provides the prolonged usage of the battery, and also reduces the overheating of the battery.

13 Claims, 4 Drawing Sheets

HYPE

CROSS REFERENCE TO RELATED APPLICATION

Not Applicable

FEDERALLY SPONSORED RESEARCH AND DEVELOPMENT

Not Applicable

MICROFICHE APPENDIX

Not Applicable

BACKGROUND OF THE INVENTION (1) Field of the Invention

The invention relates to the case, especially to the case. More particularly, the invention relates to the case, which is a cooling as well as power source.

(2) Background of the Invention

With the increasing advancement and technology in a day to day life, people are becoming more reliant to electronic devices and gadgets. These devices and gadgets have improved the lifestyle of many. For communication purpose, mobile phones are the most frequently used device. People's lives have become increasing dependent on using mobile phones as an everyday communication tool. With the development of technology, people want mobile phone features that are more advanced and more perfect. Hence, the CPU processing power is continuously growing. Such high usages of mobile phones cause the early discharge of the mobile phone's battery, and also lead to a heating problem.

With the popularity of smart phones, mobile phones continue to become faster and thinner. The mobile phones used to play games cause excessive heat, which is an issue. Currently, there are few devices in the market to resolve such issue, viz. cooling tray, a cell phone holder, and built-in cooling compounds, but they are not convenient to carry and not environmentally friendly.

At present, mobile phones have been widely used and have brought great convenience to the communication of information. People often use their phones while idle to use the Internet, play games, and to bring fun into their lives. However, the existing widespread consumption of intelligent machines has a serious problem; users often need to charge it. If there is no power in the outdoor or other places, it becomes a difficult task to charge the phone. To avoid a sudden power failure, phone users will generally carry a good backup battery charge in advance, or conserve the charge. However it is quite inconvenient to carry a spare battery or conserve the charge left on the device.

Solar cells have been used for many years to convert sun light into electricity. Solar cells can be used to power portable devices and to charge various batteries. They are able to provide power to electronic devices through direct sunlight, or from artificial light (indoor light).

Although such devices are commonly available on the market, they have not been popular with portable device users. The main shortfall is in the fact that the user needs to carry a separate device (solar charger) along with the portable device it is meant to charge. Each time a portable device needs to be charged, it first needs to be connected to the solar charger, and secondly needs to be placed in a sunny location. In another words, current solar chargers are not a practical option to charge portable electronic while you walk/move or carry on with your daily activity, they are simply too cumbersome.

Currently, mobile phones are becoming more popular. With the common cell phone, there are many shortcomings that need some improvement. Alternatives currently present in the market are either inconvenient or expensive. Also, these alternatives are quite time consuming.

Therefore, the present invention gives a solution to these shortcomings by providing a case that not only protects the phone, but is also a cooling and power source.

SUMMARY

In accordance with the invention, it is a case, named Hype, designed to satisfy the aforementioned needs.

Accordingly, it is an objective of the present invention to provide a case. More specifically, the objective is to provide a mobile case.

Another objective of the present invention is to provide a case for Laptops, GPS, tablets, Nooks, i-watches, pulses, and hand held games.

It is another objective of the present invention to provide a case that is made of plastic.

It is further objective of the present invention to provide a case that has a cooling feature. The case includes cooling fans and air holes.

It is another objective of the present invention to provide a mobile case with solar panels that serve as the primary power source. If case is detached it also can be used as cooling fan to cool a person's body in hot places.

Another objective is to provide a case that comes in designs and includes a primary source, secondary and third source of power.

In yet another objective, the present inventive product utilizes red, yellow, and green light indicators.

Still another objective of the present inventive product is to provide a strap that includes Velcro attachment.

These, together with other objectives of the invention and the various features of novelty that characterize the invention, are pointed out with particularity in the disclosure. For a better understanding of the invention, its operating advantages, and the specific objectives attained by its uses, reference should be had to the accompanying drawings and descriptive matter, in which there are illustrated preferred embodiments of the invention.

BRIEF DESCRIPTION OF THE DRAWINGS

To further clarify various aspects of some example embodiments of the present invention, a more particular description of the invention will be rendered by reference to specific embodiments thereof which are illustrated in the appended drawing. It is appreciated that the drawing depicts only illustrated embodiments of the invention and are therefore not to be considered limiting of its scope. The invention will be described and explained with additional specificity and detail through the use of the accompanying drawing in which.

DETAILED DESCRIPTION OF THE INVENTION

Figure 1:
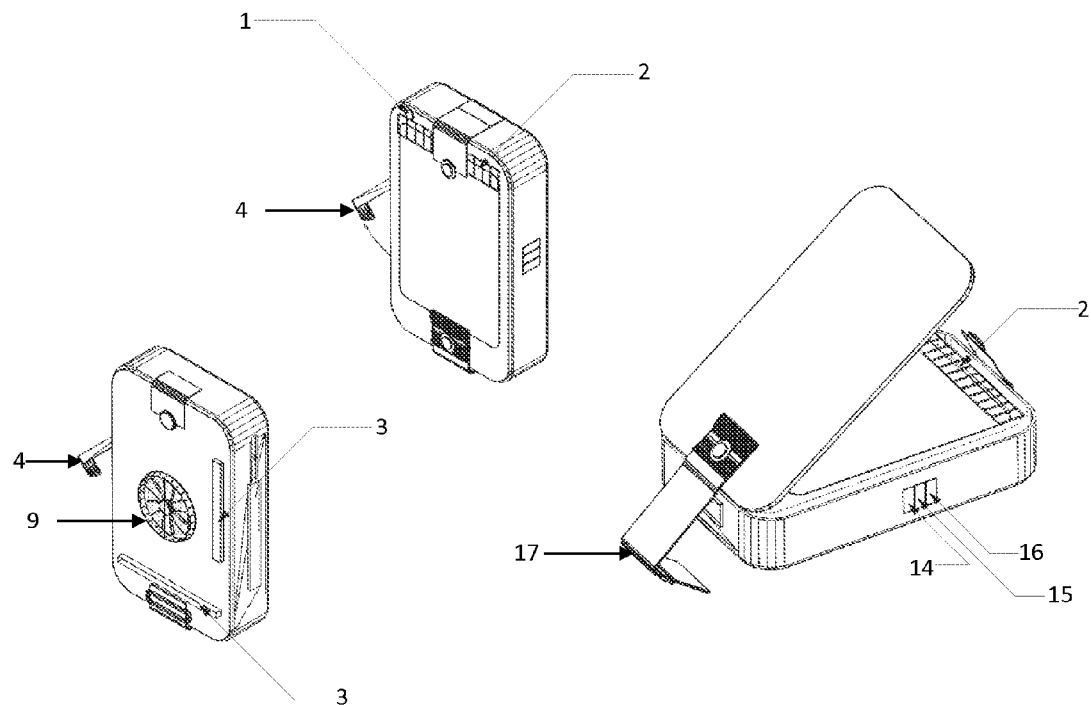
FIG. 1 is the frontal and posterior views of the case for mobile phones.

Various aspects of the illustrative embodiments will be described using the terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Turning now descriptively to the drawing, in which similar reference characters denote similar elements throughout the drawing, the accompanied figure illustrates the appearance of a mobile phone case and its various aspects thereof.

In one of the embodiment of the present invention, the inventor also made the case 12, with the cooling fans 8 and the air holes 7 to resolve the problem of over-heating due to excessive usage of portable electronic devices like mobile phones, laptops, tablet computer, GPS systems, smart watches, gaming consoles etc.

The present invention is an exclusive design; it is ergonomically designed to meet the requirements of the users extensively using the handheld gadgets. With this invention user using such devices or other related gadgets will not need to carry a separate charger with them while performing activities like taking a video, or clicking pictures or playing games implemented via various electronic devices, or geographically locating object and or working with various web or otherwise implemented information application. The invention as designed to embed a secondary and third power backup within the carry case to provide the user of devices like mobile phones, or other related gadgets with a secondary power back up system, preventing them from hassle of carrying a separate charger.

Accordingly to the present invention, power is harnessed for supplying to the device, with the solar energy through the solar power panels 2. These panels 2 are located in the front and the back of the case 12. The-case 12 of the invention has the crank 4, the secondary source of power, provided over the charging port of gadgets. The crank 4 has a lever that is rotated to charge the phone.

In the present invention, the inventor used a battery 13 embedded under the fans 8 to store energy for emergency, also it is used as a power source of the phone, such that all of the energy that is passed through the casing helps to move the fan 8 and charges the battery 13.

In accordance with the invention, the case 12 provides a panel of lights to indicate the mode of power the device is operating on, provided in the invention with the light indicators 1: red, yellow and green. Red light denotes that no power is supplied to the device whereas yellow light denotes that the power is being supplied to the device, means the device is charging and finally, when the device get charged completely, green light appears.

Further in one embodiment, the invention discloses the case provided with indicator panel displaying three modes of operations:

d) First mode 16 denotes "ON", which means the devices back-up battery 13 is used to charge the primary battery by the solar panels or the crank.

e) Second mode 15 denotes "OFF" mode, in which the charging is not actually provided, but power is being supplied to the device.

f) Third mode 14 denotes "BYPASS" mode: means the electricity in the casing from solar panels 2 will charge the back-up battery 13 and also the primary battery of a portable device placed in the case 12.

As shown in the figures, in the posterior view of the various devices, the present inventive product includes a plurality of stands 3 placed at different positions of the case 12, which helps in providing support to the device. It ensures that the device will sit up vertically or horizontally.

Preferably, in the case 12, a strap 6 with a Velcro attachment is provided, which tends to hold the device more securely. Although, the provided Velcro strap 6 should be shorter, such that the user can push the power button in front.

In a preferred embodiment the case 12 may also provide a covering assembly 9 over the fan formed of plastic an arrangement may also be made to have a suction cup 10 to secure a device placed. Further the case 12 provide a film 11 for covering the device to make the device waterproof.

The benefits of this invention are that it saves time, effort, and money. The user need not to waste his time to get his phone charged every time through the regular phone chargers. The users need not to plug it in the home outlet, which saves money on the electricity bill.

In one of the embodiments of the present invention, the inventor made the case such that it does not save the energy on the device, but instead prolongs the battery 13 usages throughout the day without wasting time.

Referring to the drawings that depict the front and rear view of the case for various devices, viz. laptops, tablets, mobile phones, portable GPS, hand held gaming console, pulse, and I-watch, according to the preferred embodiment of the present invention.

Referring to the drawings, particularly FIG. 1 represents an exemplary embodiment of the invention which is a case 12 for a mobile phone with housing a cooling system. In detail, FIG. 1 shows a plurality of views identifying the light indicators 1 emitting red, yellow and green. Red light denotes that no power is supplied to the device whereas yellow light denotes that the power is being supplied to the device, means the device is charging and finally, when the device get charged completely, green light appears; a cluster of solar panels harness power for powering to the device, with solar energy through the solar power panels 2. These panels 2 are located in the front and the back of the case 12; an indicator panel displaying three modes of operations the first mode 16 denotes "ON", which means the back-up battery 13 is used to charge the primary battery, the second mode 15 denotes "OFF" mode, in which the charging is not actually provided, but power is being supplied to the device and a third mode 14 denotes "BYPASS" mode: means the electricity in the casing from solar panels 2 will charge the back-up battery 13 and also the primary battery of a portable device placed in the case 12; a plurality of stands 3 placed at different positions of the case 12, which helps in providing support to the device, a kick stand 17 ensures that the device will sit up vertically or horizontally. Further FIG. 1 shows the fan 8 and the fan covering 9 used for the cooling of the mobile phone placed at the back of the phone in the case 12.

Figure 2:
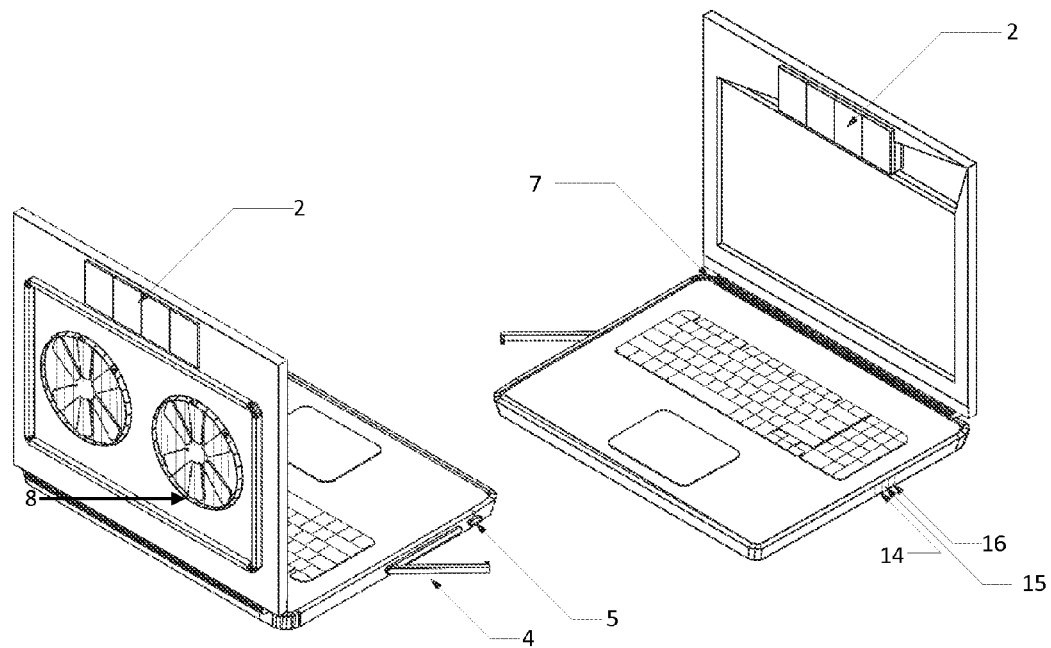
FIG. 2 is a frontal and posterior view of the laptop case.

Referring to the drawings, particularly FIG. 2 represents an exemplary embodiment of the invention which is a case 12 for a laptop with housing a cooling system. In detail, FIG. 2 shows a plurality of views identifying a cluster of solar panels harness power for powering to the device, with solar energy through the solar power panels 2, these panels 2 are located in the front and in the back of the case 12 more precisely are placed over the screen of the laptop and in the inner and outer side of the lead having the screen; an indicator panel displaying three modes of operations the first mode 16 denotes "ON", which means the back-up battery 13 is used to charge the primary battery, the second mode 15 denotes "OFF" mode, in which the charging is not actually provided, but power is being supplied to the device and a third mode 14 denotes "BYPASS" mode: means the electricity in the casing from solar panels 2 will charge the back-up battery 13 and also the primary battery of a portable device placed in the case 12; an USB opening 5 to the connect external device to the portable device and a crank 4 with a lever for removability covering the charging port of a the laptop placed inside the case 12, the fan 8 and the fan covering 9 used for the cooling of the mobile phone placed at the back of the phone in the case 12 and holes 7.

Figure 3:
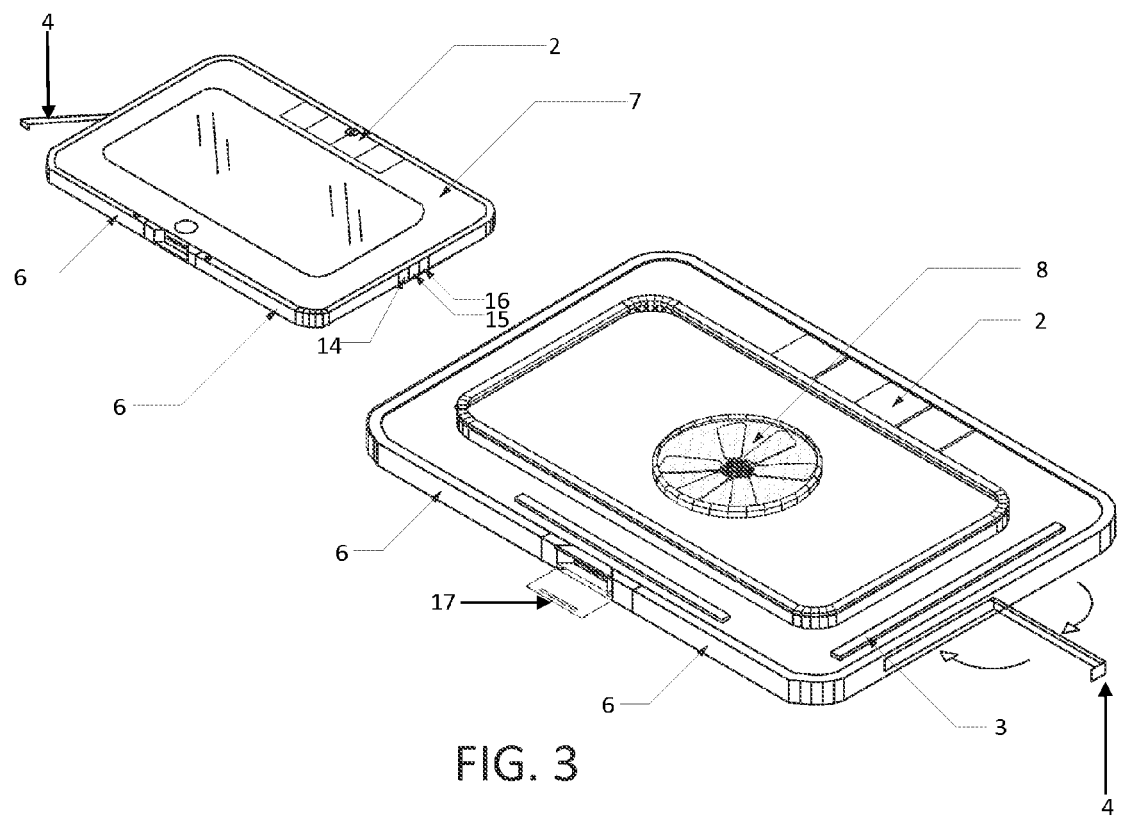
FIG. 3 is the frontal and posterior view of the-case for tablets.

Referring to the drawings, particularly FIG. 3 represents an exemplary embodiment of the invention which is a case 12 for a tablet computer with housing a cooling system. In detail, FIG. 3 shows a plurality of views identifying a cluster of solar panels harness power for powering to the device, with solar energy through the solar power panels 2, these panels 2 are located in the front and in the back of the case 12 more precisely are placed over the screen of the laptop and in the inner and outer side of the lead having the screen; an indicator panel displaying three modes of operations the first mode 16 denotes "ON", which means the back-up battery 13 is used to charge the primary battery, the second mode 15 denotes "BYPASS" mode, in which the charging is not actually provided, but power is being supplied to the device and a third mode 14 denotes "BYPASS" mode: means the electricity in the casing from solar panels 2 will charge the back-up battery 13 and also the primary battery of a portable device placed in the case 12; a plurality of stands 3 placed at different positions of the case 12, which helps in providing support to the device; a kick stand 17 ensures that the device will sit up vertically or horizontally and a crank 4 with a lever for removably covering the charging port of a the tablet computer placed inside the case 12, the fan 8, the backup battery, the third source of power, 13 under the fan 8 and the fan covering 9 used for the cooling of the tablet computer placed at the back of the tablet computer in the case 12 and air holes 7; further the case 12 is fitted with a VALCRO® strap 6 for securing the device.

Figure 4:
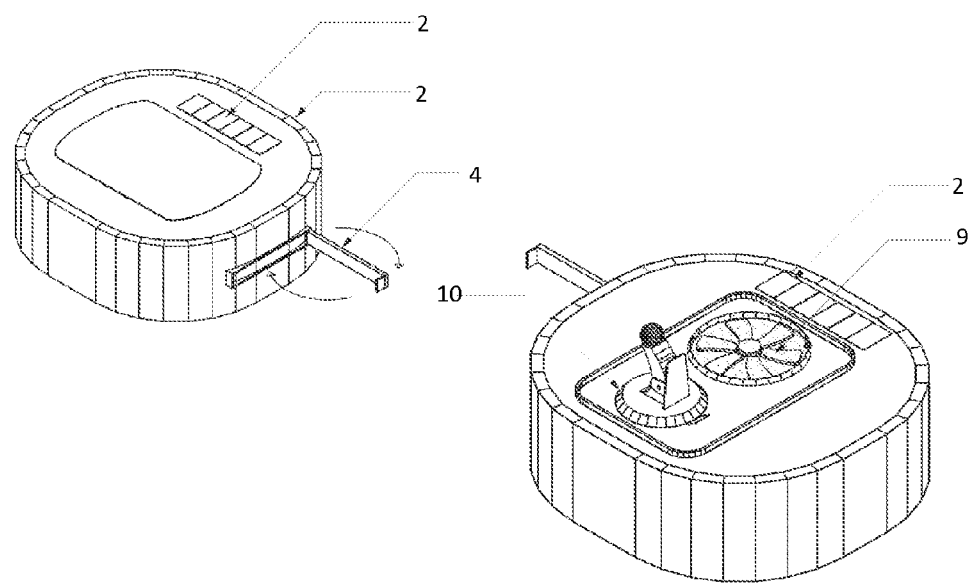
FIG. 4 is the frontal and posterior view of the case for portable GPS systems.

Referring to the drawings, particularly FIG. 4 represents an exemplary embodiment of the invention which is a case 12 for a GPS device with housing a cooling system. In detail, FIG. 4 shows a plurality of views identifying a cluster of solar panels harness power for powering to the device, with solar energy through the solar power panels 2, these panels 2 are located in the front and in the side of the case 12 more precisely are placed over the screen of the GPS device and in the inner and outer side of the lead having the screen; a crank 4 with a lever for removably covering the charging port of a the GPS device placed inside the case 12, the fan 8 and the fan covering 9 used for the cooling of the GPS device placed at the back of the GPS device in the case 12 and air holes 7; further the case 12 is fitted with a suction cup 10 for securing the device.

Figure 5:
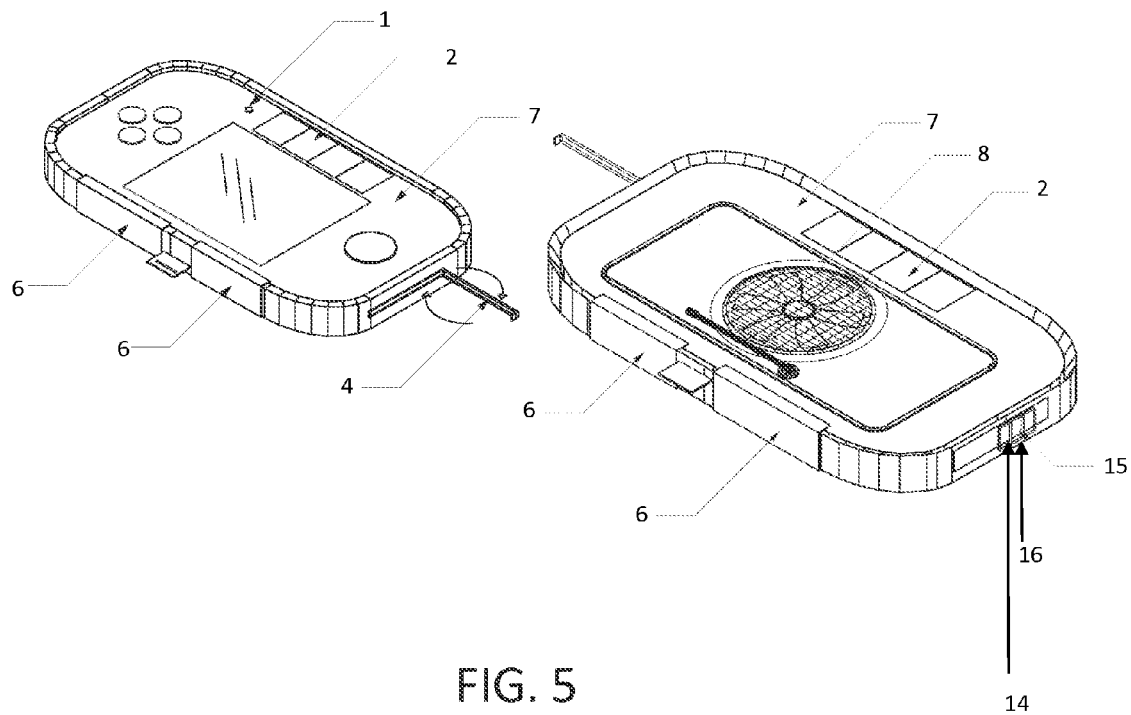
FIG. 5 is the frontal and posterior view of the case for hand held games.

Referring to the drawings, particularly FIG. 5 represents an exemplary embodiment of the invention which is a case 12 for a handheld gaming console with housing a cooling system. In detail, FIG. 5 shows a plurality of views identifying the light indicators 1 emitting red, yellow and green. Red light denotes that no power is supplied to the device whereas yellow light denotes that the power is being supplied to the device, means the device is charging and finally, when the device get charged completely, green light appears; a plurality of views identifying a cluster of solar panels harness power for powering to the device, with solar energy through the solar power panels 2, these panels 2 are located in the front and in the back of the case 12 more precisely are placed over the screen of the handheld gaming console and in the inner and outer side of the lead having the screen; an indicator panel displaying three modes of operations the first mode 16 denotes "ON", which means the back-up battery 13 is used to charge the primary battery, the second mode 15 denotes "OFF" mode, in which the charging is not actually provided, unless the crank to charge method is applied and a third mode 14 denotes ""BYPASS" mode: means the electricity in the casing from solar panels 2 will charge the back-up battery 13 and also the primary battery of a portable device placed in the case 12; a plurality of stands 3 placed at different positions of the case 12, which helps in providing support to the device; a kick stand 17 ensures that the device will sit up vertically or horizontally and a crank 4 with a lever for removably covering the charging port of the handheld gaming console placed inside the case 12, the fan 8, the backup battery 13 under the fan 8 and the fan covering 9 used for the cooling of the handheld gaming console placed at the back of the handheld gaming console in the case 12 and air holes 7; further the case 12 is fitted with a VALCRO® strap 6 for securing the device.

Figure 6:
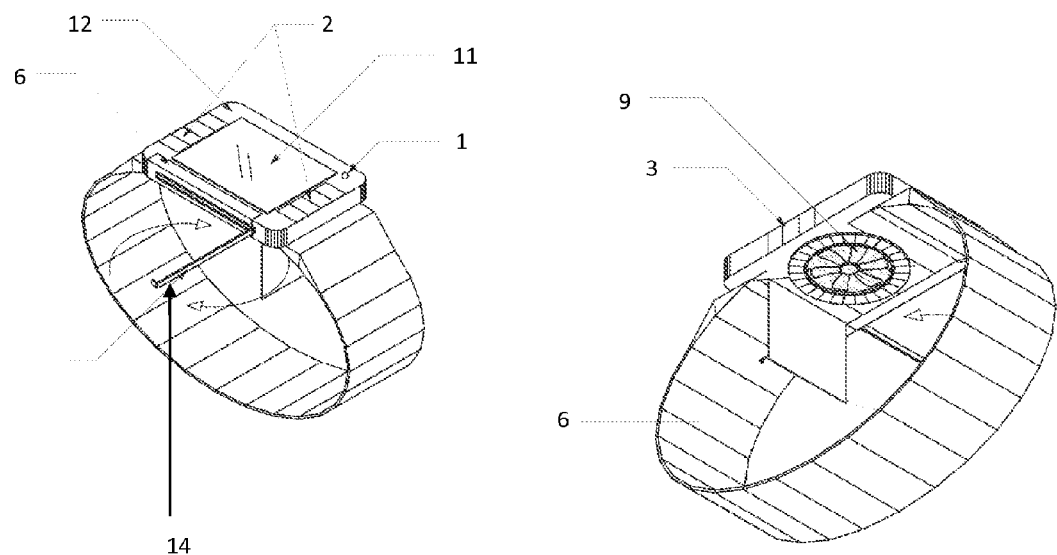
FIG. 6 is the top and bottom view of the-ase for the pulse.

Referring to the drawings, particularly FIG. 6 represents an exemplary embodiment of the invention which is a case 12 for a wearable smart device with housing a cooling system. In detail, FIG. 6 shows a plurality of views identifying the light indicators 1 emitting red, yellow and green. Red light denotes that no power is supplied to the device whereas yellow light denotes that the power is being supplied to the device, means the device is charging and finally, when the device get charged completely, green light appears; a plurality of views identifying a cluster of solar panels harness power for powering to the device, with solar energy through the solar power panels 2, these panels 2 are located in the front and in the side of the case 12 more precisely are placed over the screen of the wearable smart device and in the inner and outer side of the lead having the screen; an indicator panel displaying three modes of operations the first mode 16 denotes "ON", which means the back-up battery 13 is used to charge the primary battery, the second mode 15 denotes "OFF" mode, in which the charging is not actually provided, but power is being supplied to the device and a third mode 14 denotes "BYPASS" mode: means the electricity in the casing from solar panels 2 will charge the back-up battery 13 and also the primary battery of a portable device placed in the case 12; a crank 4 with a lever for removably covering the charging port of the wearable smart device placed inside the case 12, the fan 8 and the fan covering 9 with hard plastic used for the cooling of the wearable smart device placed at the back of the wearable smart device in the case 12; further the case 12 is fitted with a VALCRO® strap 6 on the side of the device adjacent to the crank 4, also the case 12 has a film 11 for covering the device to make the device waterproof.

Figure 7:
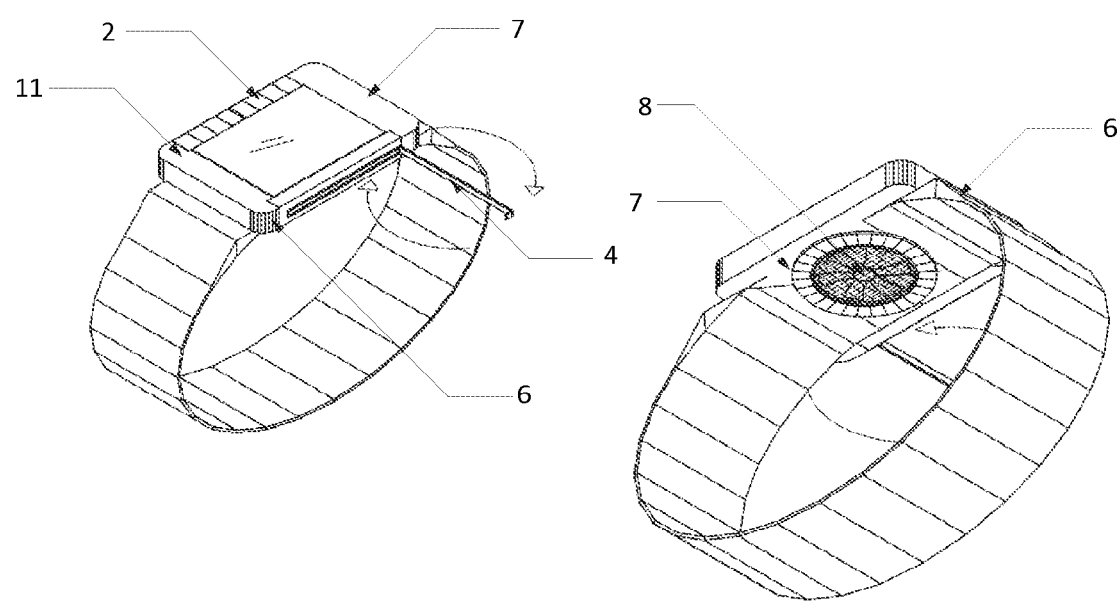
FIG. 7 is the top, bottom, and inside view of the case for Apples' i-watch.

Referring to the drawings, particularly FIG. 7 represents an exemplary embodiment of the invention which is a case 12 for an I-watch. In detail, FIG. 7 shows a plurality of views identifying a cluster of solar panels harness power for powering to the device, with solar energy through the solar power panels 2, these panels 2 are located in the front and in the side of the case 12 more precisely are placed over the screen of the wearable smart device and in the inner and outer side of the lead having the screen; a crank 4 with a lever for removably covering the charging port of the an I-watch placed inside the case 12, the fan 8 and the fan covering 9 with hard plastic used for the cooling of the an I-watch placed at the back of the I-watch in the case 12; further the case 12 is fitted with a VELCRO® strap 6 on the side of the device adjacent to the crank 4, also the case 12 has a film 11 for covering the device to make the device waterproof and air holes 7.

While a preferred embodiment of the present invention has been shown and described, it will be apparent to those skilled in the art that many changes and modifications may be made without departing from the invention in its broader aspects.

I claim:

1. A case for an electronic device comprising:
   a body;
   a cooling fan (s) and air holes;
   solar panels as primary sources of power;
   red, yellow and green light indicators;
   USB port;
   a switch enabled with "ON", "OFF" and "BYPASS" modes;
   a VELCRO strap;
   a crank a secondary source of power; and
   a back-up battery as a third source of power.

2. The case, of claim 1, wherein said case is used for an individual mobile devices.

3. The case, of claim 1, wherein said case is used for an individual laptop.

4. The case, of claim 1, wherein said case is used for an individual tablet.

5. The case, of claim 1, wherein said case is used for GPS.

6. The case, of claim 1, wherein said case is used for hand held games.

7. The case, of claim 1, wherein said case is used for nooks.

8. The case, of claim 1, wherein said case is used for an individual i-watches.

9. The case of claim 1 that is made up of plastic.

10. The case, of claim 1, provides prolonged usage of said back-up battery.

11. The case, of claim 1, reducing the over-heating of said back-up battery.

12. The case, of claim 1, wherein said case comes in various designs.

13. The case, of claim 1, wherein said "BYPASS" mode of said switch allowing electricity from said solar panels charge said back-up battery.

* * * * *